(12) United States Patent
Manini et al.

(10) Patent No.: US 6,200,494 B1
(45) Date of Patent: *Mar. 13, 2001

(54) COMBINATION OF GETTER MATERIALS AND DEVICE FOR CONTAINING THE SAME

(75) Inventors: Paolo Manini, Arluno; Claudio Boffito, Rho, both of (IT)

(73) Assignee: Saes Getters S.p.A., Lainate (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/683,386

(22) Filed: Jul. 18, 1996

(30) Foreign Application Priority Data

Aug. 7, 1995 (IT) .............................. MI95A1755

(51) Int. Cl.$^7$ ................ H01J 35/20; H01J 7/18

(52) U.S. Cl. .................... 252/181.7; 252/181.2; 252/194

(58) Field of Search .............. 252/181.2, 181.3, 252/181.6, 194

(56) References Cited

U.S. PATENT DOCUMENTS

| | | | |
|---|---|---|---|
| 4,559,471 | * 12/1985 | Kroontje | 313/553 |
| 4,645,468 | * 2/1987 | Kroontje | 445/55 |
| 4,916,105 | 4/1990 | Rieck et al. | 502/303 |
| 5,312,606 | 5/1994 | Boffito et al. | 423/210 |
| 5,312,607 | 5/1994 | Schiabel et al. | 423/210 |
| 5,408,832 | * 4/1995 | Boffito et al. | 62/451 |
| 5,505,810 | 4/1996 | Kirby et al. | 156/286 |
| 5,532,034 | 7/1996 | Kirby et al. | 428/69 |
| 5,544,490 | * 8/1996 | Manini et al. | 62/46.1 |
| 5,600,957 | * 2/1997 | Manini et al. | 62/46.1 |

FOREIGN PATENT DOCUMENTS

| | | |
|---|---|---|
| 0715138 | 6/1996 | (EP) . |
| 9418876 | 9/1994 | (WO) . |
| 9516166 | 6/1995 | (WO) . |
| 9601966 | 1/1996 | (WO) . |

OTHER PUBLICATIONS

Derwent Abstract of SU 1 104 104 A (Jul. 23, 1984).

Derwent abstract of JP 04215845 A (Jun. 8, 1992).

Patent Abstract of Japan, vol. 016, No. 556 (C–1007) Date Jun. 8, 1992.

* cited by examiner

Primary Examiner—Joseph D. Anthony
(74) Attorney, Agent, or Firm—Oppenheimer, Wolff & Donnelly, LLP

(57) ABSTRACT

A combination of getter materials particularly suitable to maintain vacuum in devices which cannot be heated at temperatures higher than about 200° C. The getter comprises: a mixture MO/Pd between an oxide of a transition metal MO chosen among cobalt oxide, copper oxide or their combinations and metallic palladium, wherein the latter is present up to about 2% by weight; and a moisture sorbing material. In some applications it is possible to add to this combination a barium- and lithium-based alloy, preferably BaLi$^4$. Getter devices for containing such a combination are also described.

6 Claims, 9 Drawing Sheets

COMBINATION OF GETTER MATERIALS AND DEVICE FOR CONTAINING THE SAME

BACKGROUND AND SUMMARY OF THE INVENTION

The present invention deals with a new combination of getter materials and the getter devices containing the same. In particular, the present invention relates to a getter combination suitable to the maintenance of vacuum in devices which cannot be heated at temperatures higher than about 200° C.

Getter materials have been found to be practically necessary in all manner of industrial applications that require maintaining a vacuum.

Until a few years ago, the walls designed to confine the vacuum were made of metal or glass in all the devices requiring vacuum for their operation. Evacuated volumes defined by metal walls are present in, for example, "thermos" or "dewars", in the thermally insulated pipes for the conveyance of cryogenic fluids, and in scientific applications such as the particle accelerators. Evacuated volumes defined by glass walls are also present e.g. in the cathode-ray tubes for television screens or computer displays and in lamps. In all these applications, a getter material is introduced into the device in an inactive state before sealing the device. The getter is then activated later, when the device is sealed, by heating it from the outside using, for example, micro- or radio-frequency waves. The activated getter absorbs the last traces of gas still present in the device and carries out the sorption of those gases which, through various mechanisms, enter the evacuated volume during the life of the device itself. The minimum temperatures required by the conventional getter materials for activation are in the order of 350°–400° C., and in some cases even temperatures of about 900° C. can be reached. Getter materials of this type are for example the zirconium- or titanium-based alloys.

However, in recent years, industrial uses of a vacuum have been extended to evacuated devices made, at least in part, of plastic materials. Such materials cannot be heated at temperatures higher than about 200° C. One example is a thermally insulated jacket under vacuum, wherein the plastic materials can be used to form the walls or the filling materials or both. The filling materials ("fillers") are generally fibers, powders of foams and are employed in the jackets to maintain their shape. A typical example of such a jacket is evacuated panels, mainly used in the production of refrigerators. The envelope of these panels is generally made of plastic-metal laminated foils, thermally sealed at their edges through a plastic-to-plastic contact. Metal-to-metal sealing are avoided in order to break the thermal bridge between the two faces of the panel. The plastic materials cannot be heated at temperatures higher than about 200° C. so as to avoid jeopardizing their chemical and mechanical stability. Therefore, the conventional getter materials that require a high activation temperature are inadequate in this type of application. There is a need for getter materials that have a low temperature of activation or, better, that require no thermal activation at all.

International Patent Application WO 94/18876 discloses the combination of an oxide of a noble metal, in particular palladium oxide (PdO), and a moisture sorbing material, such as barium oxide (BaO), for maintaining a vacuum in evacuated jackets of dewars, thermos, etc. However, the palladium oxide disclosed therein reacts with hydrogen and is converted into a finely powdered form of metallic palladium (Pd) having pyrophoric properties. Since this metal can explode and burn, this combination of materials is not recommended for safety reasons.

U.S. Pat. Nos. 5,312,606 and 5,312,607, owned by the assignee of the present application, disclose a family of alloys based on barium and lithium with other elements added such as aluminum or earth-alkaline elements; these alloys are the only known getter materials capable of sorbing practically all gases at room temperature without requiring thermal activation. Specific applications of these materials are described e.g. in the U.S. Pat. No. 5,408,832 and in the International Patent Application WO 96/01966. In particular the preferred alloy is the $BaLi_4$ alloy. In order to ensure the nitrogen sorption capacity of this alloy, which could become exhausted by the sorption of water vapor, U.S. Pat. No. 5,408,832 discloses the use of $BaLi_4$ in combination with a moisture sorbing material such as the barium oxide.

This combination of materials shows very good performances as regards the removal of $O_2$, $N_2$ and $H_2O$, and thus eliminates the principle atmospheric gases from vacuums inside the jackets of the panels. However, the gases which leak into the vacuum of these jackets come mainly from the degassing or out gassing of the materials that form the jackets, in particular the fillers which are generally in the form of powder, foam or wool, and consequently have a large surface area. The main gases being present in the vacuums formed by jackets made of plastic material are CO and $CO_2$ in case of polymeric filler and $H_2$ in case of glass wool. The amount of these gases may be significant, especially whenever manufacturing the jacket includes heating steps. For example, in manufacturing refrigerators, vacuum insulating panels are fixed to the walls of the appliances using polymeric foams, generally polyurethanes, obtained by reacting suitable chemical compounds in an in-situ foaming process. This process can achieve temperatures near 100° C. (212° F.) for times of several minutes.

Another major source of the gases which leak into the vacuum of the panels are organic compounds such as hydrocarbons or substituted hydrocarbons in which hydrogen can be replaced partially or completely by halogen atoms. Compounds in which halogen atoms completely replace hydrogen are known as CFCs and have been used for decades in the production of thermal insulating panels for refrigerators. These gases have been recognized as responsible for depleting the ozone layer of the atmosphere, and their production and use have been discontinued. However, thought has been given to recycling old panels containing CFCs by reducing the polymeric foams they contain to powders and then using these powders to produce new panels. Small amounts of CFCs could enter the vacuums of freshly-produced thermal insulating panels in this way.

Partially halogen-substituted hydrocarbons, generally referred to as HCFCs, and hydrocarbons have replaced CFCs in this field, and are used as foaming agents both in the production of panels and in the step of fixing the panels to the refrigerator walls using foams quite similar to those inside the panels. The most important gases in this application are cyclopentane, $C_5 H_{10}$, and 1,1-dichloro-1-fluoroethane, $Cl_2$ FC—$CH_3$, this latter known in the technique as R141-b. These latter gases can enter the panels through the edges, in the zone where the plastic-metal laminated foils the envelope is made of are sealed through a plastic-to-plastic thermal sealing. This results in an increasing air pressure inside the panel a decreased vacuum and in a general reduction in its thermal insulating properties.

The above described combination, $BaO/BaLi_4$ can sorb CO, $CO_2$ and, particularly, $H_2$, but does so at a relatively low speed; moreover, prior art getter materials are not known to be able to effectively absorb organic compounds.

It is therefore an object of the present invention to provide a combination of getter materials of improved sorption properties for CO, $CO_2$ and $H_2$ and capable to absorb organic compounds, which does not require thermal activation and is therefore compatible with devices in which at least one component cannot be heated at temperatures higher than about 200° C.

Another object of the invention is to provide a device for using that combination of getter materials.

According to the present invention, these and other objects are obtained with a combination of getter materials that includes a mixture of an oxide of a transition metal chosen among cobalt oxide, copper oxide or their combinations and metallic palladium containing up to about 2% by weight of metallic palladium, and a moisture sorbing material having a $H_2O$ vapor pressure lower than 1 Pa at room temperature.

Although various cobalt oxides exist, according to the oxidation number of the metal, the only one which is useful for the invention is the oxide having the empirical formula $Co_3O_4$, wherein the cobalt is present at the same time under the oxidation state II and oxidation state III. The following specification and claims use cobalt oxide to mean the compound is as defined herein. Similarly, with copper oxide, the following specification and claims uses CuO compound to include copper in the oxidation state II. Furthermore in the following the abbreviation MO will be used for labeling in general one of the two oxides of the transition metals or a combination thereof, and the abbreviation MO/Pd for indicating the mixture between MO and metallic palladium. The properties of these oxides were already known, for instance by an article by Belousov et al., Ukrainskij Chimiceskij Zurnal, 1986, 52, No. 8, but only for the sorption of hydrogen.

During the preparation of the oxide of the transition metal, a precursor of the metallic palladium is added to the latter in such a quantity to have a final mixture containing up to about 2% by weight of the mixture Mo/Pd. Palladium can be coprecipitated with the oxide of the transition metal by its introduction into the same mother solution in the form of soluble salt, e.g. $PdCl_2$. As an alternative, palladium may be deposited from a solution onto grains of transition metal oxide being previously formed. The oxide of the transition metal is used in a powdered form with particle size of less than 500 µm and preferably between 1 and 200 µm.

The moisture sorbing material may be chosen from among chemical moisture sorbers. These materials, known in the art, fix the water in an irreversible way through a chemical reaction. Suitable for this application are the chemical dryers having a $H_2O$ vapor pressure lower than 1 Pa at room temperature, as described in U.S. Pat. No. 5,408,832 of the assignee of this application. For example, the oxides of calcium, strontium, barium and phosphorous or their combinations are considered suitable for achieving the objects of the invention. The use of barium oxide or calcium oxide is particularly preferred. The moisture sorbing material is preferably used in the form of powder having a particular size between about 50 and 500 µm. With a greater particle size an excessive reduction of the surface area of the powder is experienced, whereas with lower particle size there is the risk that, due to the moisture sorption, the powders become excessively compacted, which hinders the passage of gases through the powders themselves. In order to overcome the problem of compaction of humid powders, it is also possible to add to the moisture sorbing material a powder of an inert material, such as alumina, as described in the mentioned International Patent Application WO 96/01966.

The ratio by weight between the materials of the combination of the invention may vary within broad limits, also depending on the type of use that is foreseen and in particular of the gas mixture to be sorbed. However, in general, the ratio by weight between mixture MO/Pd and the moisture sorbing material can vary between about 5:1 and 1:20, and preferably between 1:1 and 1:5.

In one contemplated application, it is foreseen that the vacuum initially present in the jacket can also be degraded by atmospheric gases such as $O_2$ and $N_2$. It is possible to also add a barium- and lithium-based alloy among those described in the U.S. Pat. Nos. 5,312,606 and 5,312,607 mentioned before to the combination Mo/Pd with moisture sorber as described above. These patents are incorporated by reference for their details about the preparation and properties of these alloys. The barium- and lithium-based alloy is preferably used in a powdered form with particle size of less than about 500 µm, and preferably less than about 150 µm, in order to increase the surface area. The powder may also be slightly compressed as indicated in the cited Application WO 96/01966. The preferred alloy is that of $BaLi_4$ composition, mentioned above.

The barium- and lithium-based alloys and the cobalt or copper oxides have a mutual reaction and should therefore be kept separated in order not to cause alterations of the performances of the getter combination.

The ratios by weight between the barium- and lithium-based alloy and the other components of the combination according to the invention can vary within broad ranges. The ratio by weight between mixture MO/Pd and the barium- and lithium-based alloy may generally vary between 10:1 and 1:5 and preferably between 5:1 and 1:2. The ratio by weight between the moisture sorbing material and the barium- and lithium-based alloy may vary approximately between 50:1 and 1:5, preferably between 20:1 and 1:1.

Another aspect of the invention refers to the getter devices containing the combination of materials so far described.

BRIEF DESCRIPTION OF THE DRAWINGS

In the following description reference is made to the drawings in which:

FIG. 1.a shows a possible alternative embodiment of a getter device of the invention;

DETAILED DESCRIPTION

The combination of getter materials according to the invention is preferably used by placing it within a container, in order to have a compact getter device, that is easy to handle. The container is preferably made of a material which is impermeable to gases and has an opening of such a size that the gases have access to the various getter materials according to a given order. This is done because it has been found that the water vapor impairs the properties of the mixture MO/Pd.

The container is generally made of metals that are impermeable to gases. Preferred metals are aluminum, which has light weight and is easy to be machined at low cost; and stainless steel, when higher mechanical strength is desired, mainly for automated handling of getter devices.

Figure 1:
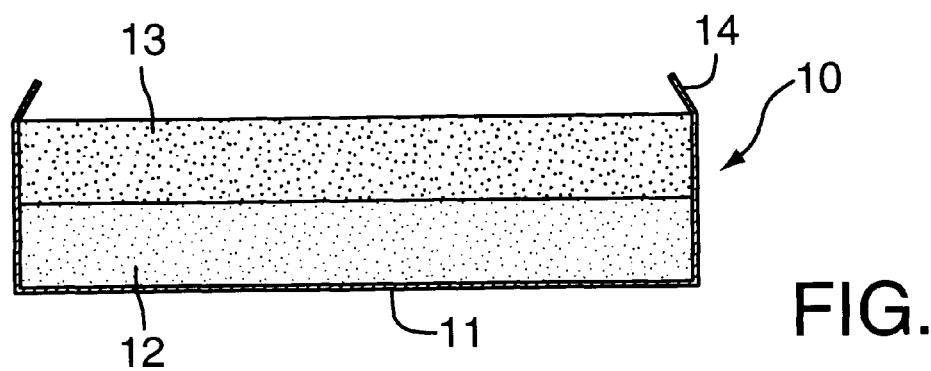
FIG. 1 shows a possible embodiment of a getter device of the invention.

A possible embodiment is illustrated in FIG. 1, where a is getter device 10 according to the invention is shown being formed of a holder 11 made of aluminum, the lower portion of which contains a layer of MO/Pd mixture 12, and the upper portion a layer of powder of a moisture sorbing material 13. These materials may be introduced in the holder in various ways, for example by pouring the powder into the holder and subjecting it to a slight compression, or by introducing into the holder some pre-formed pellets. In both cases it is also possible that at the interface between the layers of different materials there are elements of mechanical separation which allow an easy passage of gases, such as nets of plastic material, gauzes, disks of porous paper (not shown in the figure). These elements help to keep the materials separated from each other and to hold fragments of material that may be produced in consequence of impacts or e.g. by swelling of the powders due to the gas sorption. Finally the upper, open edge of the holder 11 is slightly bent inwards, thus forming a retention element 14 which keeps the getter structure in the desired position.

In another possible embodiment, the upper, open edge of the holder is not bent inwardly. This embodiment is preferred when the getter device is intended for use in applications where the filler is a polymeric foam, e.g. polyurethane. In this case a straight upper edge performs a cutting action, and it makes easier the insertion of the device in the foam panel by compression, mainly in automated productions. This embodiment is shown in FIG. 1.*a*, where the elements making up the device are referred to by the same numbers as in FIG. 1, but for element number 15 that is the non-bent upper edge.

Figure 2:
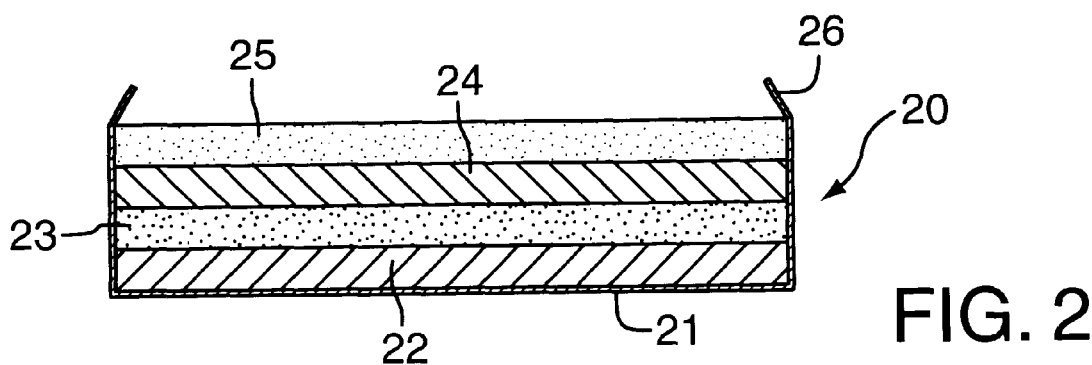
FIG. 2 shows a possible embodiment of the getter device of the invention in case of a mixture with three components MO/Pd, moisture sorbing material and barium- and lithium-based alloy.

In case that the ternary combination of materials is used, comprising also a barium- and lithium-based alloy, in manufacturing the device it should be considered that these alloys can react with the mixture Mo/Pd, and thereby these two materials have to be kept separated; furthermore, like the mixture MO/Pd, also the barium- and lithium-based alloys are sensitive to water and should be protected therefrom. To carry out these conditions, various constructions of the getter devices are possible. In the simplest embodiment, as shown in FIG. 2, a device 20 is used, composed of a holder 21 including at the inside, when going from the bottom upwards, a layer 22 of mixture MO/Pd, a layer 23 of moisture sorptive material, a layer 24 of a barium- and lithium-based alloy and finally, in contact with the external environment, a second layer 25 of moisture sorptive material. Like in the device of FIG. 1, the upper edge of the holder 21 may be inwardly bent thus defining a retention element 26 which keeps the layers of various materials at the desired position. In alternative, the upper edge of the holder may be of the non-bent kind, as in FIG. 1.*a* (not shown). The layers of materials from 22 to 25 can be either introduced in the form of loose powders to the holder 21 where they can be possibly subjected to a light pressure to enhance the mechanical stability of the layer, or pellets of the materials may be prepared separately for their subsequent introduction into the container 21. In both cases it is possible to separate the different layers by means of elements of mechanical separation such as polymeric gauzes or the like, not shown in the drawing, such as described in case of the device of FIG. 1.

Figure 3:
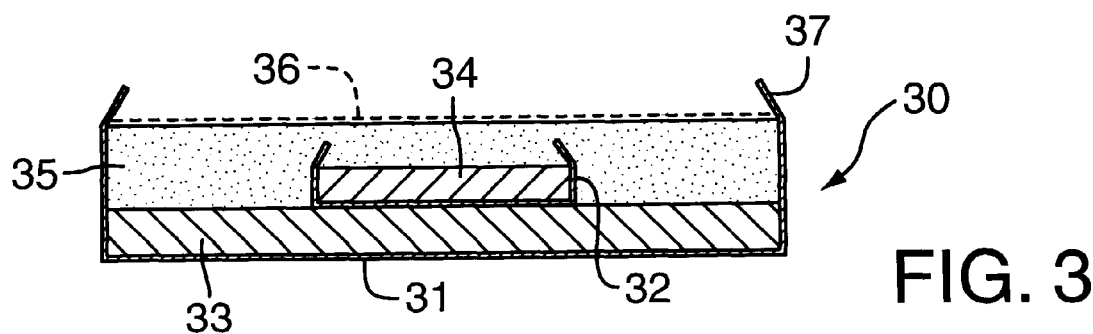
FIG. 3 shows the preferred embodiment of the getter device according to the invention in the case of a mixture with three components MO/Pd, moisture sorbing material and barium- and lithium-based alloy.
Figure 1A:
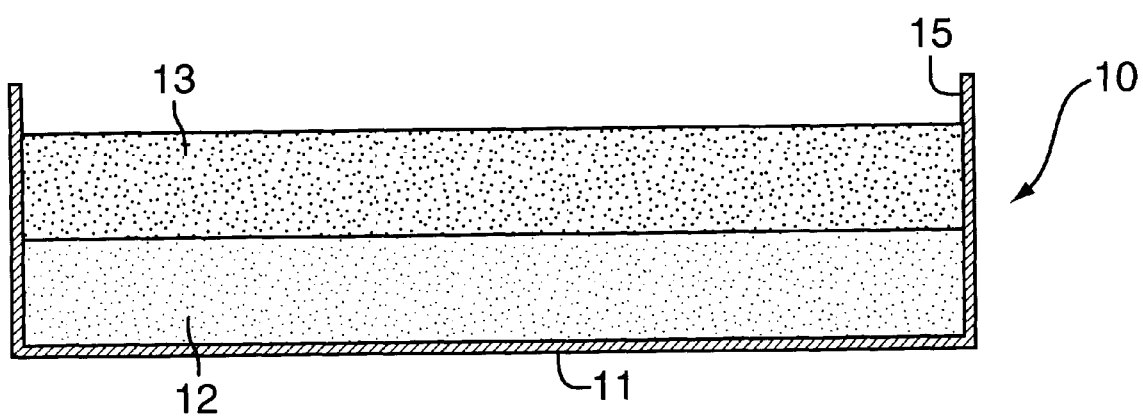

A preferred embodiment of the getter device containing also the barium- and lithium-based alloy is shown in FIG. 3. In this case the getter device 30 is composed of a first holder 31 made of stainless steel or aluminum, containing on its bottom layer or a pellet 33 of powdered mixture MO/Pd. A second holder 32 made of stainless steel is placed over the layer 33 and filled with barium- and lithium-based alloy 34. The assembly formed of the powdered mixture MO/Pd 33, holder 32 and the powdered barium- and lithium-based alloy 34 is then coated with powder of a moisture sorptive material 35. On the upper portion of the powder 35, exposed to the vacuum outside, an element of mechanical retention is preferably placed to allow an easy passage of gases, such as a polymeric net or a gauze 36. Like in the structure of FIG. 1, such polymeric gauzes may be also positioned over the layer of MO/Pd and over the powder of barium- and lithium-based alloy to prevent the powders from mixing up and to enhance the mechanical stability of the resulting structure (these additional polymeric gauzes are not shown in the drawing). Finally, the upper edge of the holder may be slightly bent to the inside thus forming a retention element 37 to keep the resulting getter structure at its position, or may be of the non-bent kind to help introduction of the device in polymeric foam panels, as shown in FIG. 1.*a* (this last possibility not shown in the drawings).

Objects and advantages of the present invention will result more clearly apparent to those skilled in the art from the following examples, which have a merely explanatory purpose and thereby do not limit the scope of the invention.

EXAMPLE 1

This example refers to the preparation of a getter device according to the invention.

1 g of mixture $Co_3O_4$/Pd, including 10 mg of Pd, is placed on the bottom of a cylindrical holder of stainless steel having a diameter of 28 mm and height of 4 mm and is lightly pressed; over the layer of $Co_3O_4$/Pd thus obtained a gauze of a polymeric material is positioned to keep the powder at the desired position. 4.5 g of BaO are introduced in the holder, over this first layer, and are then pressed lightly. The upper edge of the holder is finally deformed by bending to the inside in such a way to hold both layers in their starting configuration, thus obtaining a device corresponding to the one shown in FIG. 1.

EXAMPLE 2

This example refers to the preparation of a second getter device of the invention comprising, in addition to the mixture MO/Pd and the moisture sorbing material, also a barium- and lithium-based alloy.

1 g of mixture $Co_3O_4$/Pd, containing 10 mg of Pd, is placed on the bottom of a first cylindric holder of stainless steel having a diameter of 28 mm and height of 6 mm and is lightly pressed; over the obtained layer of $Co_3O_4$/Pd a gauze of polymeric material is positioned to keep the powder at a desired position. A second cylindric holder of steel, having a diameter of 15 mm and a height of 3 mm, is prepared separately and is filled-with 0.25 g of $BaLi_4$ alloy, lightly compressed and coated with a gauze of polymeric material. The holder of $BaLi_4$ alloy is introduced in the first holder, over the gauze that keeps in position the mixture $Co_3O_4$/Pd. 4 g of powdered BaO are then poured into the first holder until completely coating both the $Co_3O_4$/Pd mixture and the holder with $BaLi_4$ alloy. The powdered BaO is made level, lightly compressed and covered by means of a gauze of a polymeric material to keep it in position. Finally, the upper edge of the first holder is slightly bent inwardly to keep in position the whole structure, thus obtaining a getter device corresponding to that shown in FIG. 3.

EXAMPLE 3

This example deals with the test of gas sorption by the getter device of Example 1.

Figure 4:
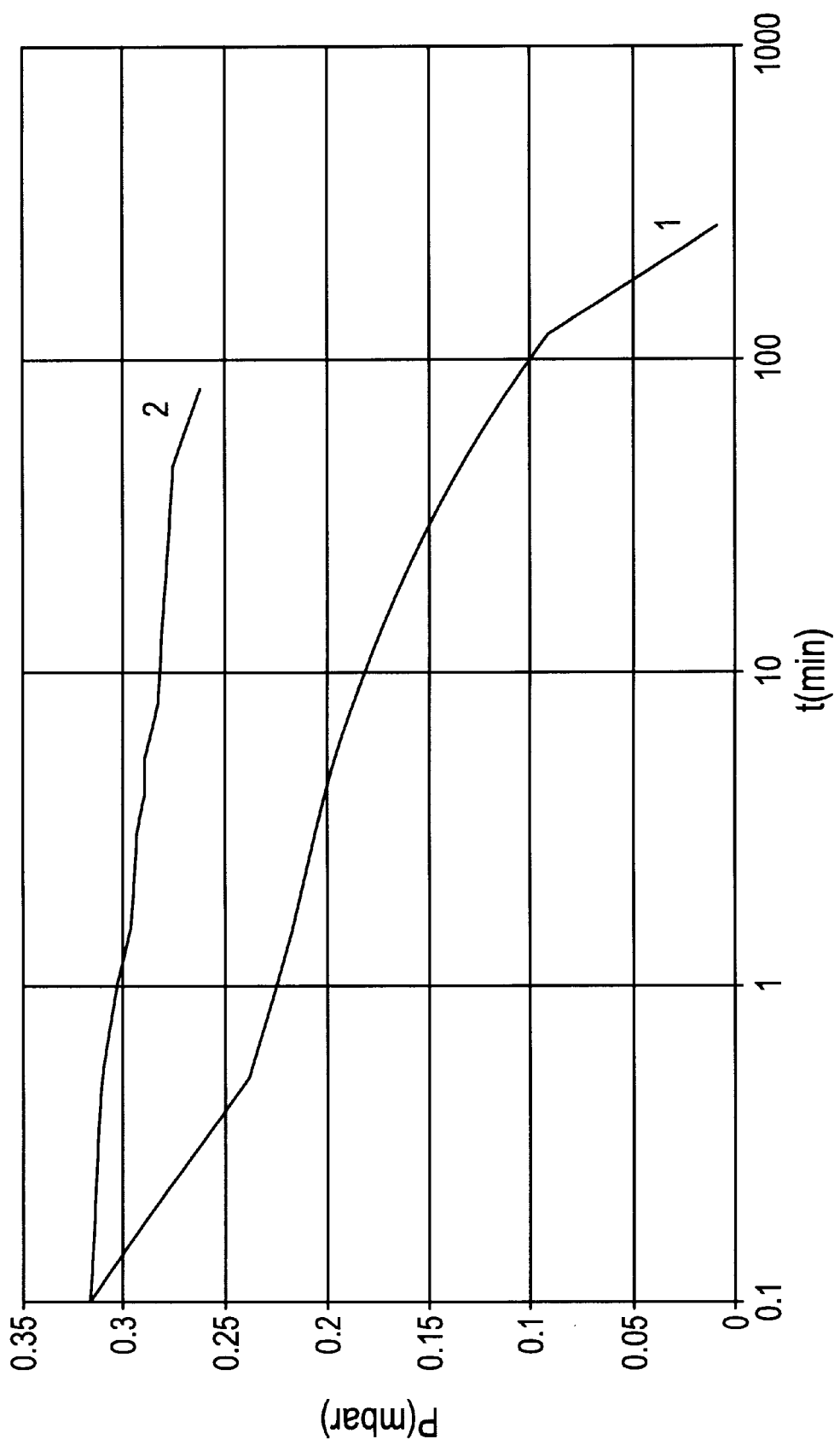
FIG. 4 shows a graph relating to the sorption of a mixture of gases by a getter device containing a combination of materials of the invention, as compared to the sorption of the same mixture of gases by a getter device of the prior art.

The device according to the Example 1 is placed in a measuring chamber having a volume of 1,5 l which is connected to a capacity pressure gauge and, through intercepting valves, to inlet and outlet gas pipings. A gaseous mixture is introduced in the measuring chamber which comprises 50% CO and 50% $H_2$, as a simulation of a possible gaseous environment in a plastic jacket containing a filler, until reaching a total pressure in the chamber of 0.32 mbar. Finally the chamber is closed and the pressure variations (mbar) are monitored in function of the time (minutes). The result of the test, that is carried out at room temperature, is plotted in FIG. 4 as curve 1.

EXAMPLE 4 (COMPARATIVE)

The test of example 3 is repeated, but using a getter device of the prior art in place of a getter device of the invention. The comparison getter device has a structure similar to that of example 1, but containing 0.25 g of $Bali_4$ and 4.5 g of BaO. The result of this test is plotted in FIG. 4 as curve 2.

EXAMPLE 5

This example deals with the test of gas sorption by the getter device of Example 2.

Figure 5:
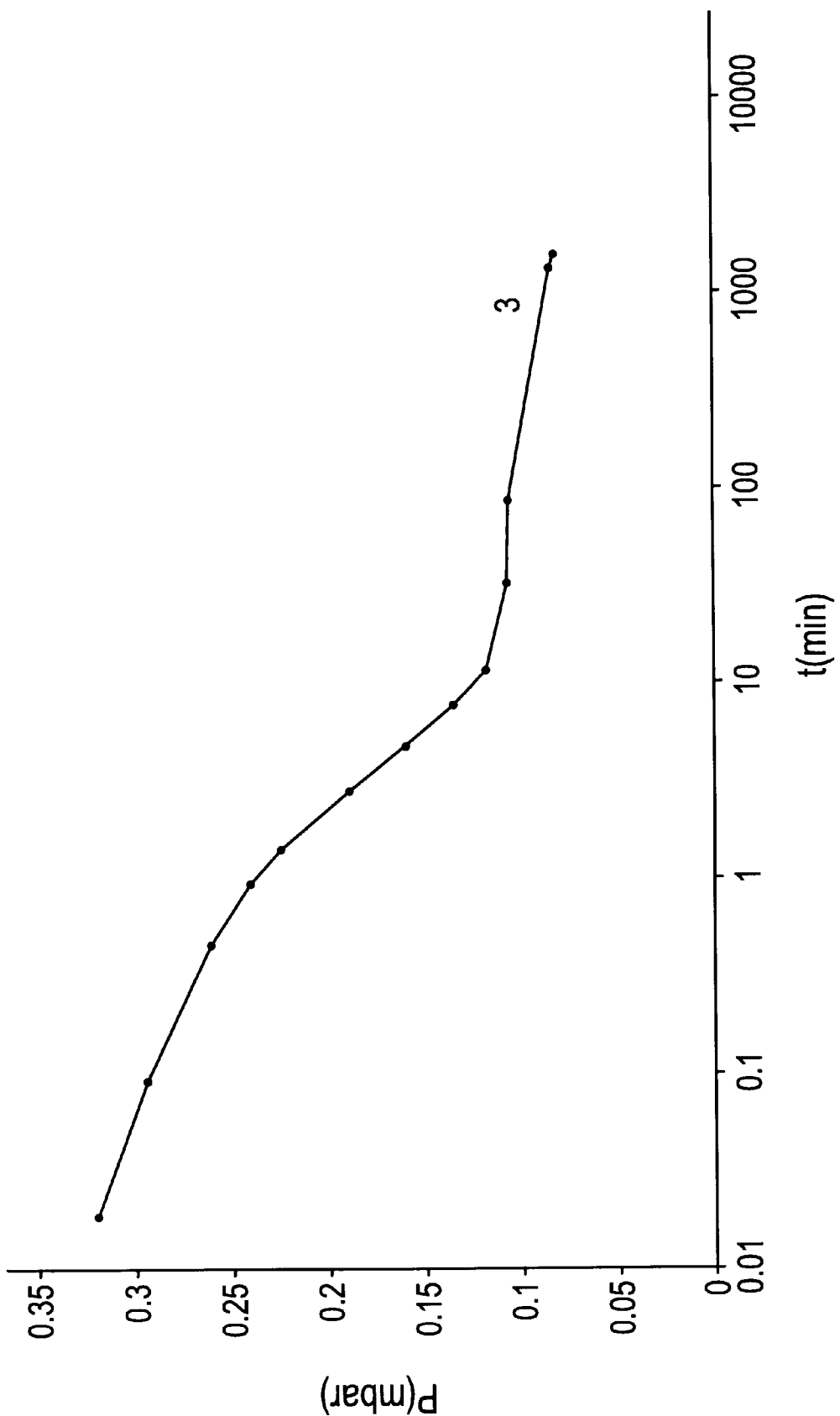
FIG. 5 shows a graph relating to the sorption of a mixture of gases by a getter device containing a combination of materials of the invention including the optional barium- and lithium-based alloy.

The test of Example 3 is repeated, except for introducing in the measuring chamber a gaseous mixture comprising 33.3% CO, 33.3% $H_2$ and 33.3% $N_2$. The variations of the pressure in the chamber are monitored in function of the time at the presence of the device of Example 2. The test result is plotted in FIG. 5 as curve 3, giving the overall pressure in the chamber (mbar) as a function of time (minutes).

EXAMPLE 6

This example deals with the test of gas sorption by a getter device similar to that of example 1, where BaO is replaced by CaO.

Figure 6:
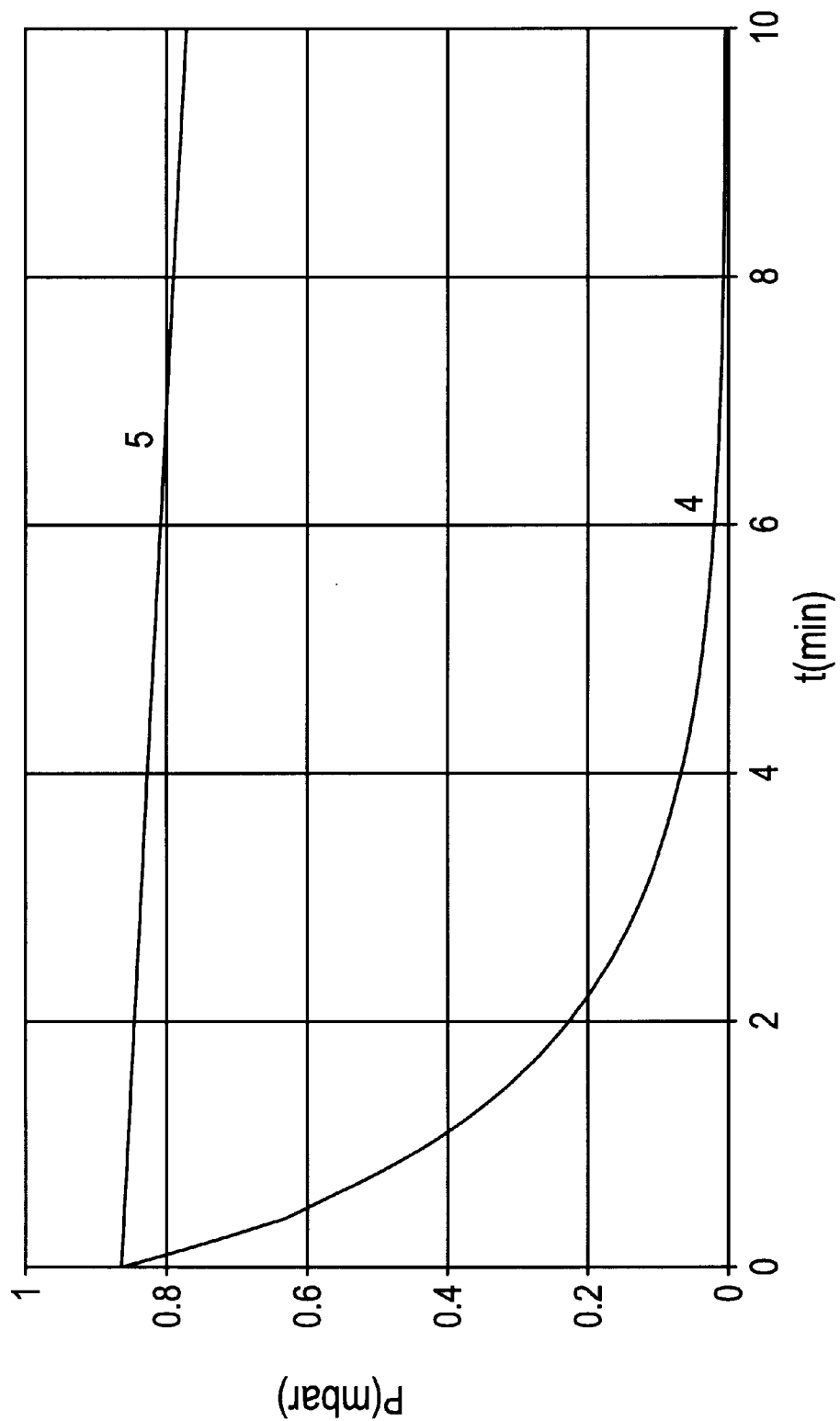
FIG. 6 shows the comparison between the sorption of carbon dioxide ($CO_2$) by a getter device containing a combination of materials of the invention including the optional barium- and lithium-based alloy and by a prior art getter device.

A getter device containing 2 g of CaO, 1 g of $Co_3O_4$ and 10 mg of Pd is introduced in a measuring chamber similar to that of example 3, of total volume 0.74 l. The chamber is evacuated at a pressure of $1.33 \cdot 10^{-5}$ mbar. $CO_2$ is then let in the chamber until reaching a pressure of 0.86 mbar, and the pressure variations (mbar) are monitored as a function of time (minutes). The result of this test is plotted in FIG. 6 as curve 4.

EXAMPLE 7 (COMPARATIVE)

The test of example 6 is repeated, but using the prior art getter device of example 4. The result of this test is plotted in FIG. 6 as curve 5.

EXAMPLE 8

This example deals with the test of gas sorption by the getter device of Example 2.

Figure 7:
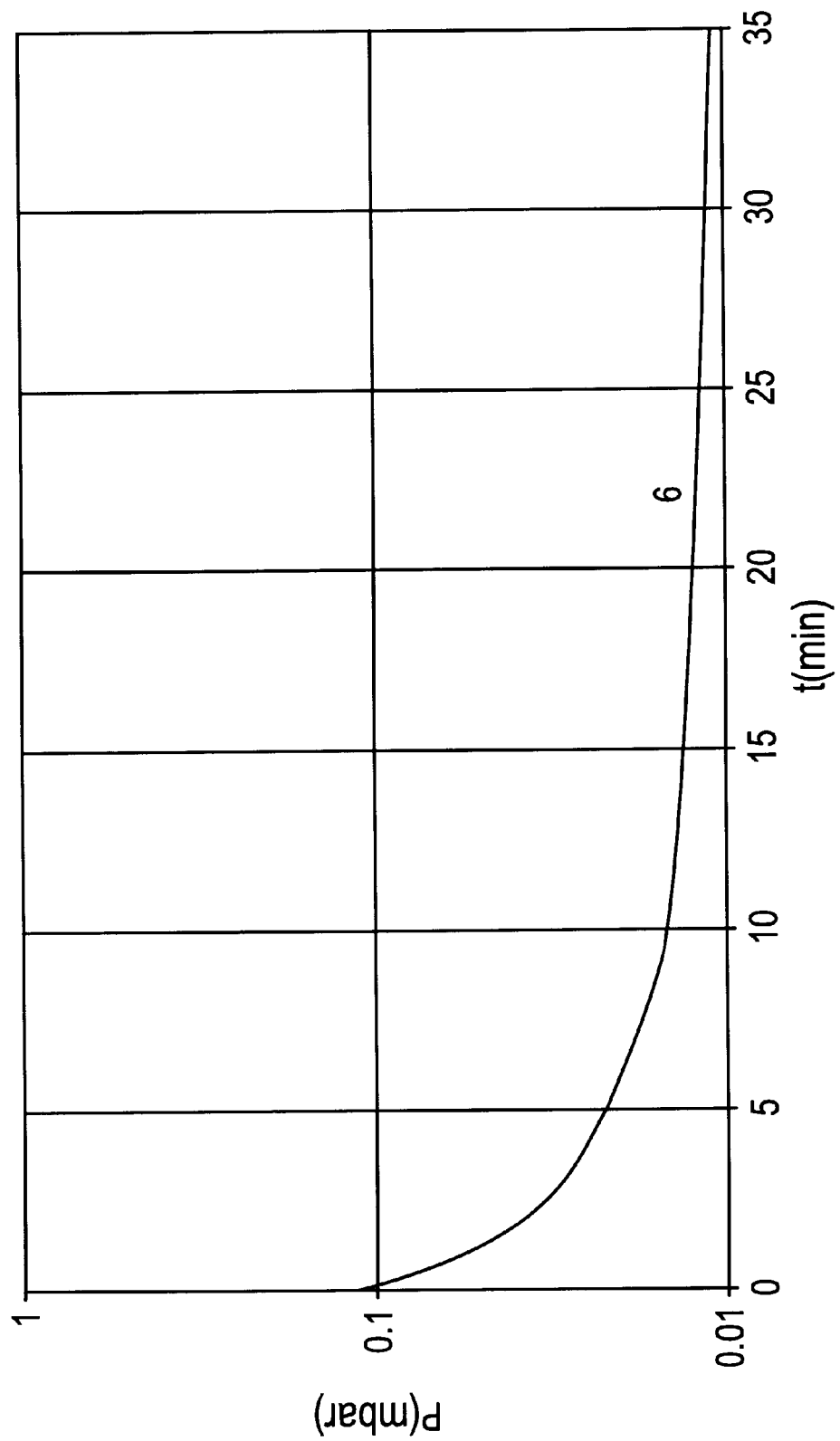
FIG. 7 shows a graph relating to the sorption of cyclopentane by a getter device containing a combination of materials of the invention.

The test of Example 3 is repeated, except for introducing in the measuring chamber cyclopentane as the test gas. The variations of the pressure in the chamber are monitored in function of the time at the presence of the device of Example 2. The test result is plotted in a semilogarithmic graph in FIG. 7 as curve 6, as pressure (mbar) as a function of time (minutes).

EXAMPLE 9

This example deals with the test of gas sorption by the getter device of Example 1.

Figure 8:
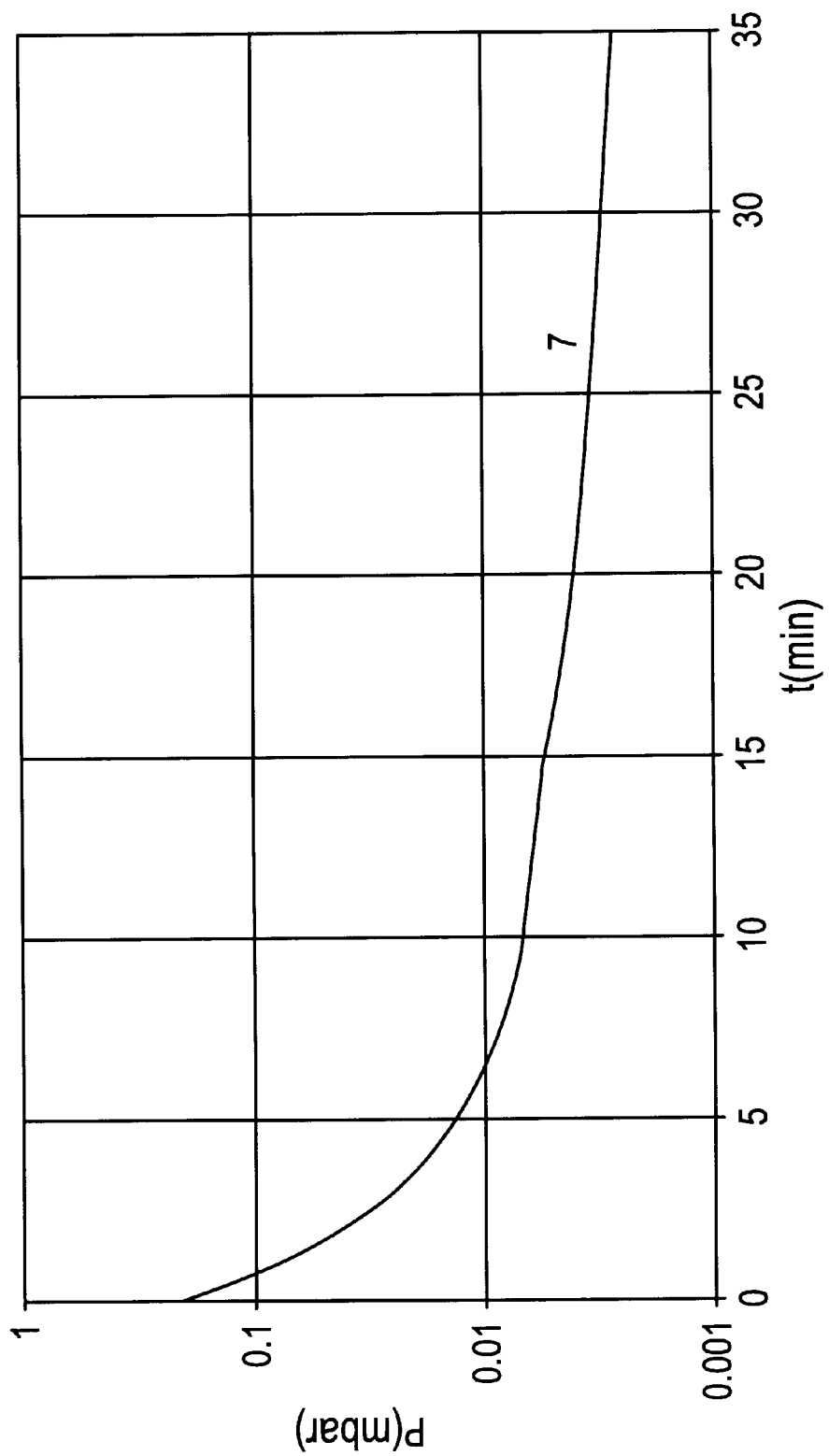
FIG. 8 shows a graph relating to the sorption of a HCFC gas by a getter device containing a combination of materials of the invention.

The test of Example 3 is repeated, except for introducing in the measuring chamber 141-b gas. The variations of the pressure in the chamber are monitored in function of the time at the presence of the device of Example 1. The test result is plotted in a semilogarithmic graph in FIG. 8 as curve 7, as pressure (mbar) as a function of time (minutes).

EXAMPLE 10

This example deals with the test of gas sorption by the getter device of Example 1.

Figure 9:
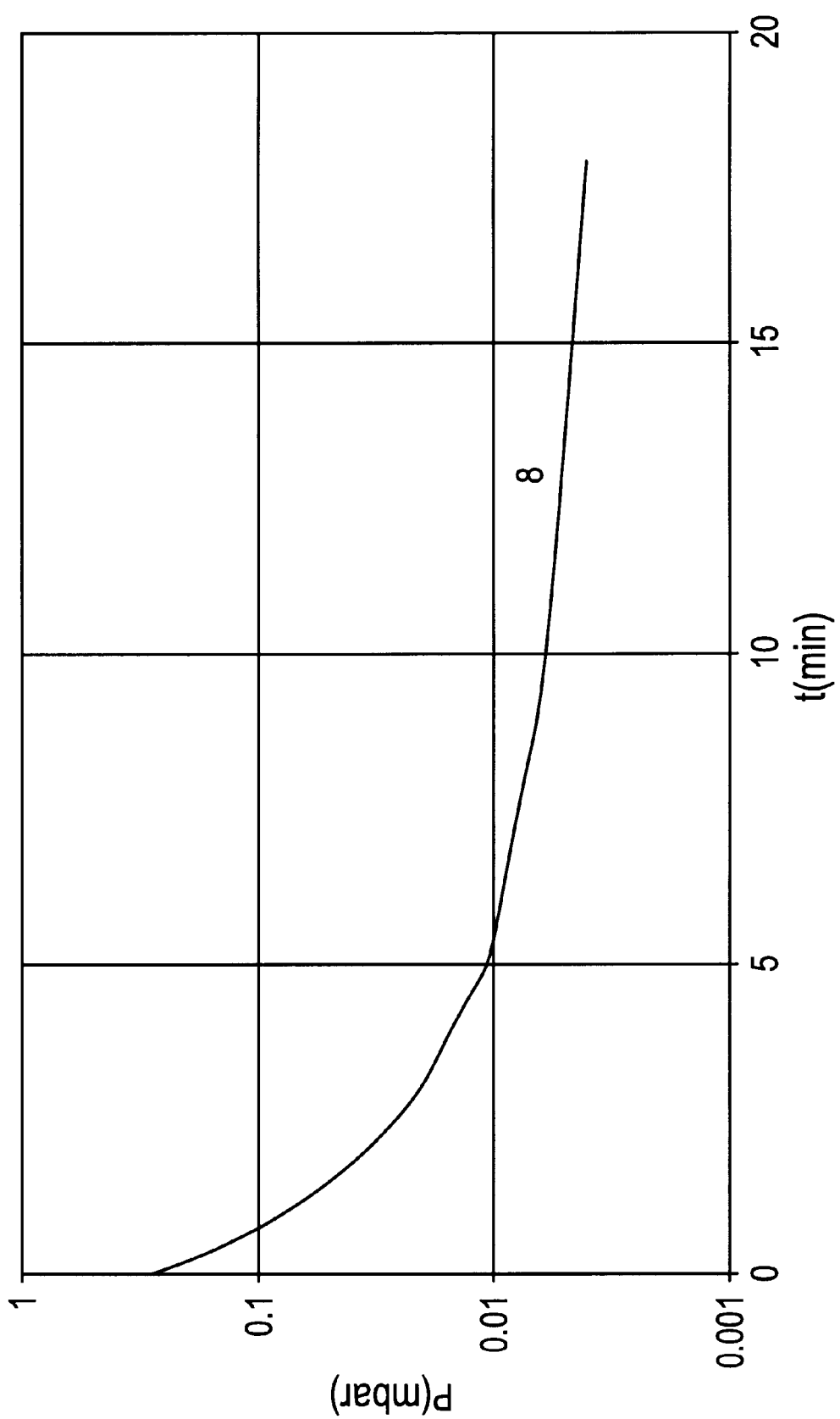
FIG. 9 shows a graph relating to the sorption of a CFC gas by a getter device containing a combination of materials of the invention.

The test of Example 3 is repeated, except for introducing in the measuring chamber the CFC gas known as CFC 11. The variations of the pressure in the chamber are monitored in function of the time at the presence of the device of Example 1. The test result is plotted in a semilogaritmic graph in FIG. 9 as curve 8, as pressure (mbar) as a function of time (minutes).

EXAMPLE 11

This example deals with the test of gas sorption by the getter device of Example 2.

Figure 10:
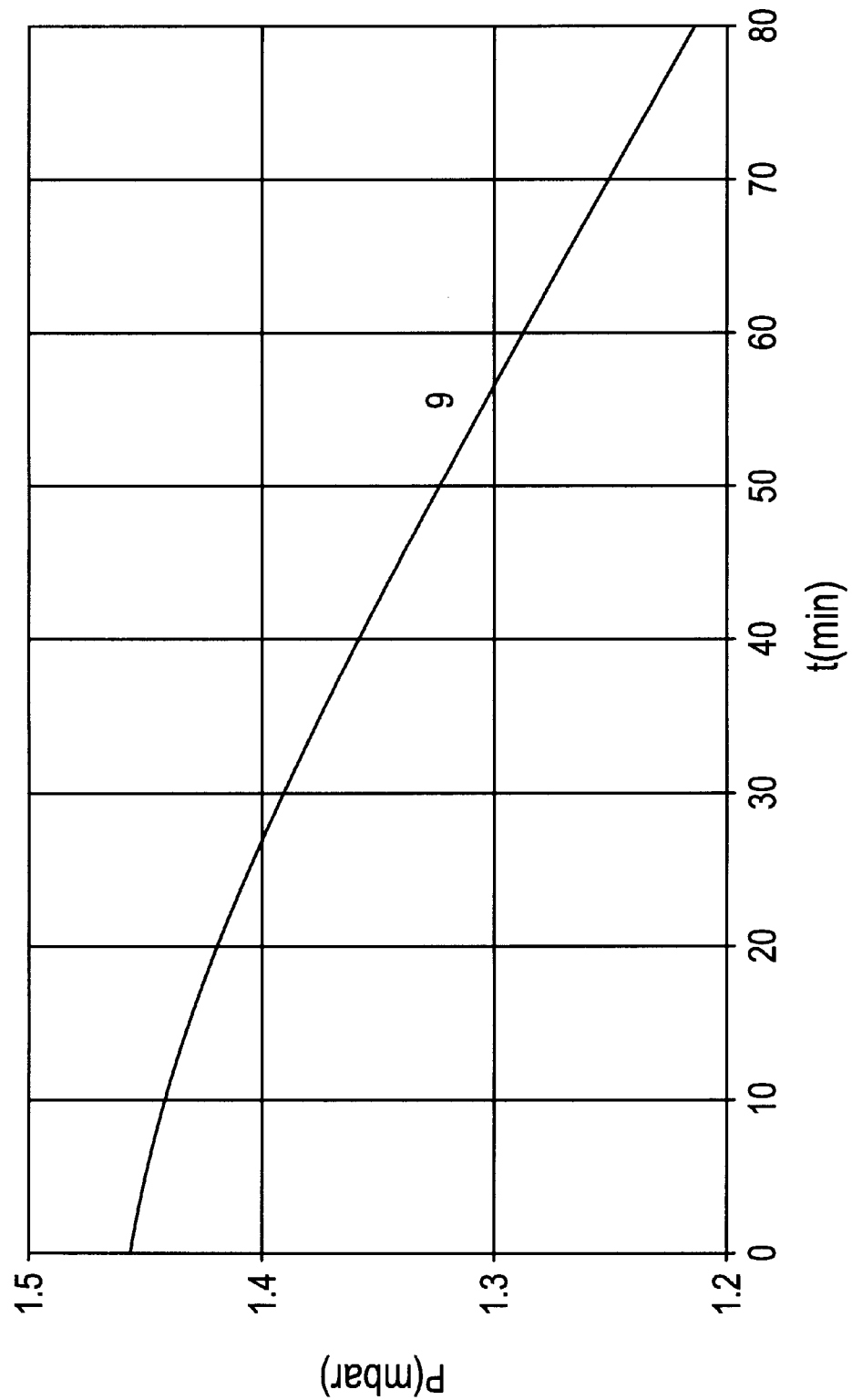
FIG. 10 shows a graph relating to the sorption of nitrogen by a getter device containing a combination of materials of the invention, including the optional barium- and lithium-based alloy, after absorption of cyclopentane.

After completion of example 8, nitrogen is let in the chamber until a pressure of about 1.45 mbar is reached. The chamber is closed and the pressure variations (mbar) are monitored as a function of time (minutes). The result of this test is plotted in FIG. 10 as curve 9.

Examining the results of examples 3 to 10 it is clearly seen that the combination of materials of the invention effectively absorbs all the gases that are expected to enter thermal insulating jackets, and particularly panels for refrigerators, during their operation. In particular, it is seen that gases such as hydrogen and carbon monoxide are absorbed in a few minutes, where prior getters that had a low activation temperature required longer times; also, it is seen that the combinations of the invention are unexpectedly able to sorb organic gases, ranging from hydrocarbons to wholly halogen-substituted hydrocarbons, CFCs, through intermediate HCFCs; finally, the results of tests show that the sorption of nitrogen, representative of atmospheric gases, is not impaired by previous (or, in operation, simultaneous) absorption of organic gases. The combinations of materials of the invention and the devices containing them represent thus a reliable solution to the problem of keeping the desired degree of vacuum inside thermal insulating jacket that cannot withstand thermal treatment above 150° C. and that work at room temperature.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously thought of. Numerous variations and changes can be made to the foregoing illustrative embodiments without departing from the scope and spirit of the present invention as set forth in the appended claims.

We claim:

1. A getter composition comprising:

a cobalt oxide ($Co_3O_4$), wherein the cobalt is present at the same time under the oxidation state II and oxidation state III, mixed with palladium forming a mixture, wherein palladium is approximately 2% wt/vt of said mixture;

said mixture combined with a moisture sorbing material selected from the group of either calcium oxide, strontium oxide, barium oxide or phosphorous oxide, having a $H_2O$ vapor pressure lower than 1 Pa at room temperature and a particle size between 50 and 500 $\mu$m; and at least one sorbed gas compound sorbed by said mixture at a temperature of less than 150° C., the sorbed gas compound being selected from the group consisting of hydrocarbons, halogenated hydrocarbons, and partially halogenated hydrocarbons.

2. The composition according to claim 1, wherein said moisture sorbing material is a combination of two or more of calcium oxide, strontium oxide, barium oxide or phosphorous oxide.

3. The composition according to claim 1, wherein a $BaLi_4$ alloy is added to said composition.

4. The composition according to claim 1, wherein a copper oxide (CuO) is mixed with the cobalt oxide.

5. The composition according to claim 1, wherein said mixture is combined with said moisture sorbing material at a ratio of between 5:1 and 1:20.

6. The composition according to claim 5, wherein said ratio is between 1:1 and 1:5.

* * * * *